United States Patent

Menkhoff et al.

[11] Patent Number: 5,740,089
[45] Date of Patent: Apr. 14, 1998

[54] ITERATIVE INTERPOLATOR

[75] Inventors: Andreas Menkhoff, Freiburg; Klaus Heberle, Reute, both of Germany

[73] Assignee: Deutsche ITT Industries GmbH, Freiburg, Germany

[21] Appl. No.: 823,896

[22] Filed: Mar. 17, 1997

Related U.S. Application Data

[63] Continuation of Ser. No. 388,289, Feb. 14, 1995, abandoned.

[30] Foreign Application Priority Data

Feb. 26, 1994 [DE] Germany .................. 44 06 300.8

[51] Int. Cl.$^6$ .................................................. G06F 7/38
[52] U.S. Cl. .................................................. 364/723
[58] Field of Search .......................... 364/718, 119, 364/723, 724.1

[56] References Cited

U.S. PATENT DOCUMENTS 3,789,203   1/1974   Catherall et al. ............... 364/723
4,951,244   8/1990   Meyer .............................. 364/723
5,020,014   5/1991   Miller et al. ..................... 364/723
5,175,701   12/1992  Newman et al. ................ 364/723
5,258,938   11/1993  Akamatsu ........................ 364/723

FOREIGN PATENT DOCUMENTS

2135590B2   1/1972   Germany .

OTHER PUBLICATIONS

"Fuzzy Logic", *Computertechnik*, 1991, No. 3, pp. 188–206, von Altrock, 1991.

*Primary Examiner*—Chuong Dinh Ngo
*Attorney, Agent, or Firm*—Plevy & Associates

[57] ABSTRACT

An iterative interpolator permits linear interpolation between a first known value and second known value, which are defined by n-coordinate values in an n-dimensional coordinate system. An intermediate value to be interpolated is defined by n−1 intermediate values. By an interval nesting process in a first coordinate direction, an approximate value is formed for the first intermediate value. A copying device transfers this interval nesting process to the required coordinate value in the other coordinate direction.

25 Claims, 5 Drawing Sheets

$$ys = \frac{(ye - ya) \cdot (xs - xa)}{(xe - xa)} + ya$$

$$ys = \frac{ye}{xe} \cdot xs$$

$$R = \frac{Z1 \cdot Z2}{N}$$

$ya = -ye$
$xa = -xe$ $$ys = \frac{ye}{xe} \cdot xs$$

$$R = \frac{Z1 \cdot Z2}{N}$$

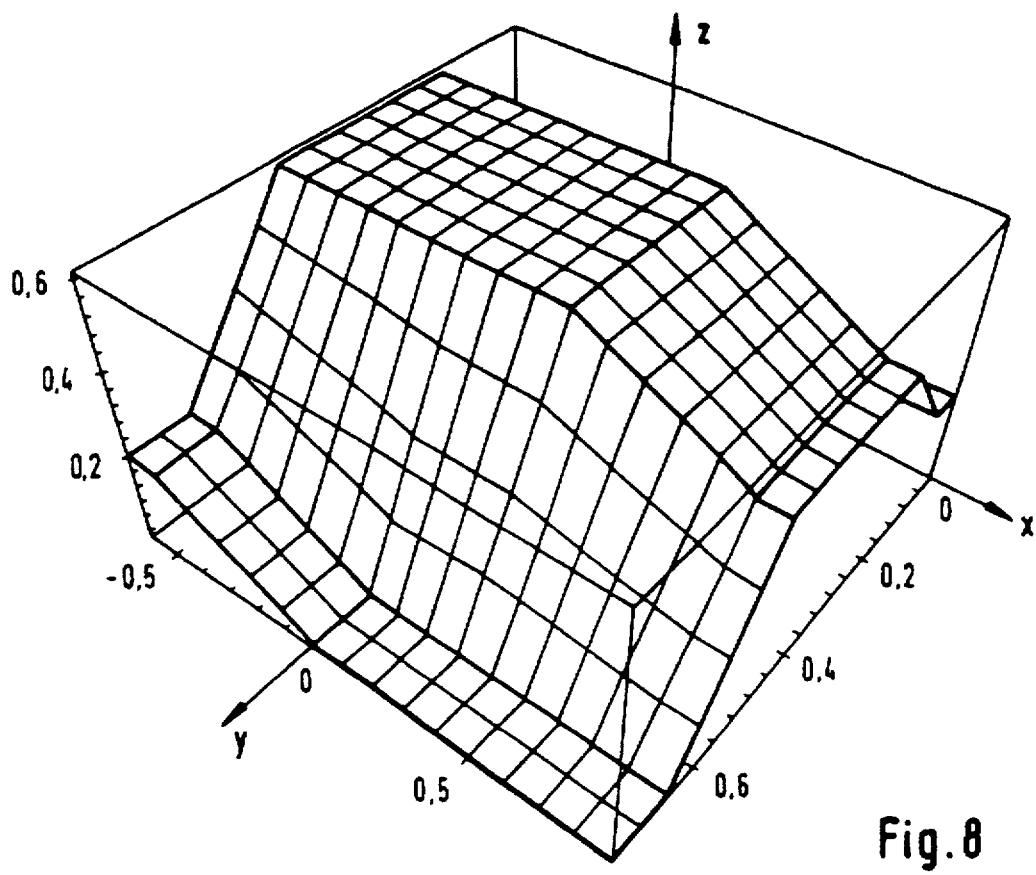
Fig. 8
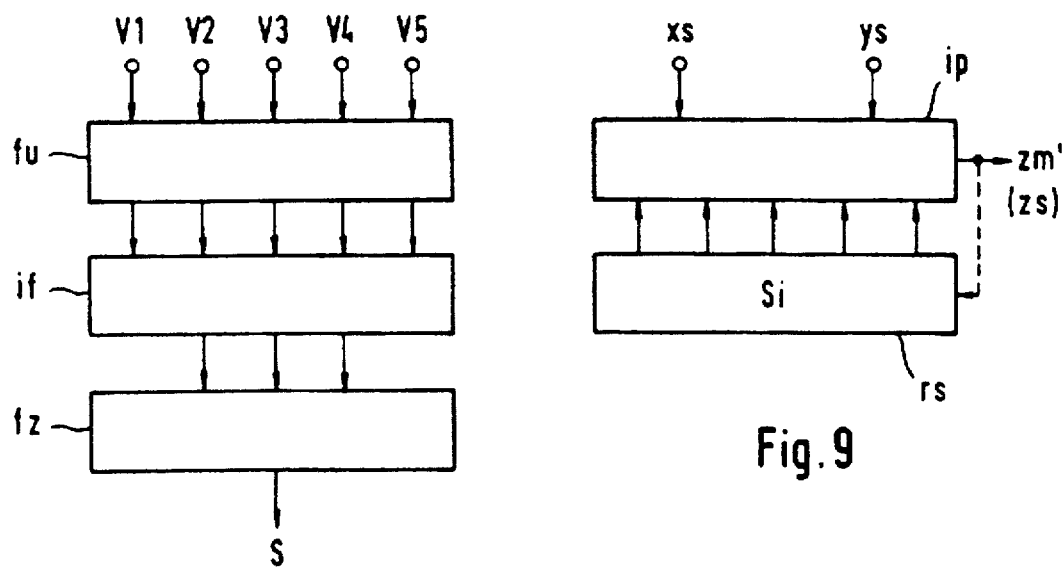
Fig. 7
Fig. 9

ITERATIVE INTERPOLATOR

This is a continuation of application Ser. No. 08/388,289, filed on Feb. 14, 1995, entitled ITERATIVE INTERPOLATOR, now abandoned.

FIELD OF THE INVENTION

The present invention relates to an iterative interpolator for linear interpolation between known values.

BACKGROUND OF THE INVENTION

In many technical tasks it is necessary to interpolate between two points or known values. The simplest type of interpolation is linear interpolation, also called "straight-line interpolation". In this process, the two points to be interpolated are connected by a straight line, and the required intermediate value is calculated. An example of such a straight-line interpolation in a plane is shown in FIG. 1 along with an associated interpolation formula. A calculation according to that formula has the disadvantage of being relatively complex and requiring three subtractions, one addition, one multiplication, and one division. Therefore, to technically implement this formula, at least one adder/subtracter as well as one relatively costly multiplier and divider are needed. These functional units may be implemented in software or hardware or even in a mixed implementation in software and hardware. This depends on the organization of the respective processor and on the necessary processing speed. A further disadvantage of the calculation according to the conventional interpolation formula is that the intermediate result must be processed with double accuracy after the multiplication and with triple accuracy after the subsequent division in order that the output value will not become inaccurate or even wrong due to preceding range limitations.

It is, therefore, an object of the present invention to provide an improved interpolator for linear interpolation between known values which manages without multipliers and dividers for the individual coordinate values.

SUMMARY OF THE INVENTION

The present invention interpolator performs an interpolation with respect to a given intermediate value in a first coordinate direction using an interval nesting process and transfers this interval nesting process to a second coordinate direction to find the required interpolation value. The required interpolation value is replaced with an "n" approximate value, whose accuracy is arbitrarily predeterminable. The only algebraic functions that are necessary are additions and/or subtractions and, as division, simple arithmetic shifts. If binary-coded binary numbers are used, a shift by a single place, as is well known means that the value of the respective binary number is either halved or multiplied by a factor of 2. Both operations may involve a range extension, so that the output signal has a higher resolution or accuracy. The same applies to the use of two's complement binary numbers. In this number system, the adders and subtracters become simpler, since the respective arithmetic operation is only dependent on the sign of the individual values.

BRIEF DESCRIPTION OF THE FIGURES

The invention and further advantages will now be explained in more detail with reference to the accompany drawings, in which:

FIG. 7 shows a typical scheme of conventional fuzzy processors;

FIG. 8 shows schematically a three-dimensional map for two input variables with associated output quantity;

FIG. 9 shows a simple embodiment of a control circuit with an interpolator according to the invention.

DETAILED DESCRIPTION OF THE FIGURES

Figure 1:
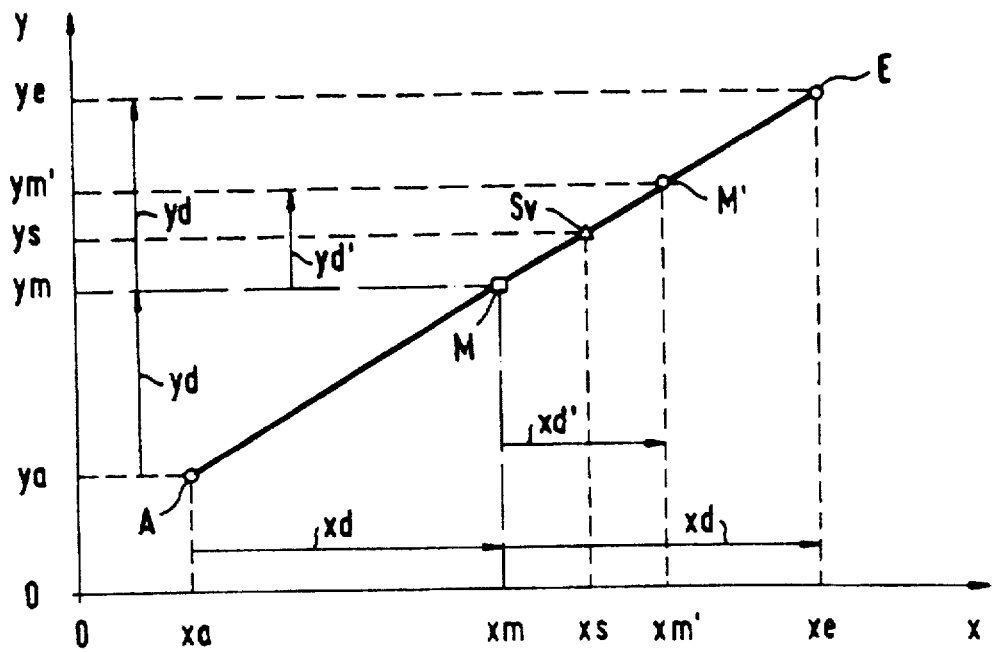
FIG. 1 is a schematic diagram illustrating a straight-line interpolation in the x/y-coordination system.

FIG. 1 shows the well-known straight-line interpolation in the plane, along with the interpolation formula belonging thereto. First and second known values A and E with the coordinates xa, ya, and xe, ye, respectively, define a straight line, of which FIG. 1 shows only the portion between A and E. Located between the coordinate values xa, xe is a first intermediate value xs, whose associated y-value ys is not known. The two coordinate values xs, ys define a required intermediate value Sv, which is located on the previously defined straight line. The required interpolation value ys is determined by the formula given in FIG. 1, $$ys = \frac{(ye - ya)*(xs - xa)}{(xe - xa)} + ya$$

The formula is derived from the well-known straight-line equation. Its calculation requires the above-mentioned arithmetic operations, i.e., multiplication and division.

The invention, in avoiding the multiplication and division, shows a simple way to obtain the required interpolation value ys from the first intermediate value xs. The invention can be used to advantage with binary numbers, but it can also be adapted to other number systems.

The teaching of the invention consists in the fact that the required interpolation value ys is replaced by an approximate value ym' which is found by an interval nesting process.

As a first step, a first approximate value xm is formed, as a rule, by the mean between the coordinate values xa and xe. Simultaneously with the first approximate value xm, a first difference value xd is formed, which corresponds to the distance of the first approximate value xm from the two coordinate values xa, xe. After the formation of the first approximate value xm and the first difference value xd in an initialization stage f, a comparison is performed in a first interaction cycle to determine whether the first approximate value xm is greater or less than the first intermediate value xs. Depending on the result of this comparison, a modified difference value xd', which is equal to one half the first difference value xd, is added to or subtracted from the first approximate value xm. The halving is effected simply by an arithmetic shift of the first difference value xd in the LSB direction. The combination of the first approximate value xm and the modified difference value xd' defines a modified first approximate value xm', which is compared with the first intermediate value xs in the second interaction cycle. For the associated interval nesting step, the current, i.e., modified first difference value xd' is halved again, and this value is added to or subtracted from the modified first approximate value xm', whereby the approximation is further improved. This interval nesting continues until either the respective current difference value xd or further difference value yd falls below a predetermined threshold value g or until some other breakoff criterion, e.g., a predetermined number of interval steps, is fulfilled (see also FIG. 6).

As a result of this interval nesting, the first intermediate value xs is given no longer as a precise value, but as an approximate value xm', with the degree of the approximation being arbitrarily high, however. To the first approximate value xm on the x-coordinate correspond a point M on the line between A and E, as a rule the mean value, and a second approximate value ym on the y-coordinate. Similarly, a modified point M' on the straight line and a second approximate value ym' in the second coordinate direction y correspond to each modified first approximate value xm'. In the same manner as the interval nesting process approximates the first intermediate value xs in the first coordinate direction x, the modified point M' approximate the intermediate value Sv on the straight line, and the second modified approximate value ym' approximates the interpolation value ys in the second coordinate direction y. According to the invention it must be ensured that the interval nesting process of the first coordinate direction x is linearly transferred to the second coordinate direction y. As the initial value for this interval nesting in the y-direction, a second approximate value ym is formed which, analogously to the first approximate value xm, lies midway between the second coordinate values ya and ye. At the same time a second difference value yd is formed which corresponds to the distance of the second approximate value ym from the two coordinate values ye and ya. For each interval step of the interval nesting in the second coordinate direction y, the current second difference value yd, yd' is halved, and added to or subtracted from the respective second approximate value ym, ym'. The order of the additions or subtractions is arbitrary as long as their assignment to the interval nesting process in the first coordinate direction is preserved. It is most expedient to carry out the interval nesting process in the two coordinate directions x and y in parallel if possible, whereby the amount of circuitry required for copying can be minimized, see the embodiment of FIG. 6.

Figure 2:
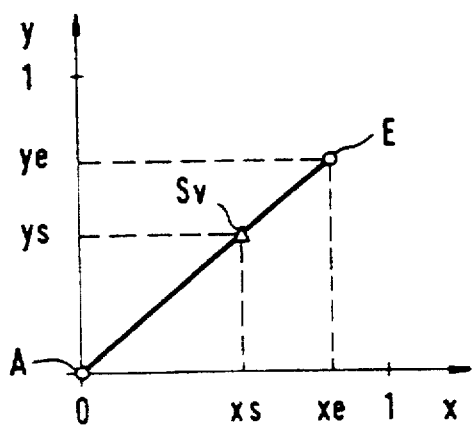
FIGS. 2 and 3 relate to specific interpolations for determining ratios.

FIG. 2 illustrates by a specific case of interpolation that an interpolator according to the invention can also be used to calculate a ratio of R=Z1*Z2/N. If a suitable factor in the ratio R is replaced by the numerical value 1, a pure multiplication or a pure division between two arbitrarily predeterminable numerical values will correspond to the ratio R. The interpolator can thus be used to advantage as a multiplier, divider, or ratio device in digital signal-processing or control circuits, with the required amount of circuitry being very small compared with conventional solutions. For this specific application it is advantageous if the absolute numerical values to be processed are less than 1, since the results will then remain within this limited range of numbers. The diagram of FIG. 2 applies for numerical values which remain within the positive range between 0 and +1, and the diagram of FIG. 3 applies for numerical values within the range between −1 and +1.

In the two-dimensional coordinate system x, y of FIG. 2, the first known value A has the coordinate values 0 in both directions. The second known value E has the coordinate values xe and ye. Also given is the first intermediate value xs. Through these given values, the interpolation formulas of FIG. 1 reduce to:

$ys = ye \cdot xs / xe$.

This corresponds to a required ratio of R=Z1*Z2/N if ye=Z1, xe=N, and xs=Z2, with Z2 having to be less than N.

Figure 3:
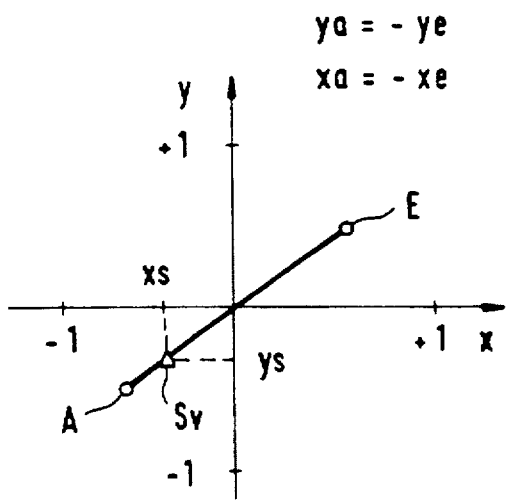

If positive and negative numerical values are permitted, the first and second known values A, E have to be arranged in accordance with the coordinate scheme of FIG. 3, so that the intermediate value Sv to be interpolated lies between the two known values A, E. The two known values are centrosymmetrical with respect to the origin of coordinates. The coordinates of the two known values must therefore be as follows: xa=−xe and ya=−ye. Through these given values, the interpolation formula of FIG. 1 reduces to: $ys = ye \cdot xs / xe$. This corresponds to a required ratio of R=Z1*Z2/N if ye=−ya=Z1, xe=−xa=N, and xs=Z2, with the absolute value of Z2 having to be less than that of N.

If the numerical values to be processed are greater than the predetermined ranges of FIG. 2 or FIG. 3, the iteration will advantageously be preceded by a normalization. In the case of binary numbers, the greatest number and, together with it, all other numbers are shifted by such a number of places that the greatest number lies within the desired range. After the iteration, the original numerical scale is restored by means of an inverse shift by the same number of places.

Figure 4:
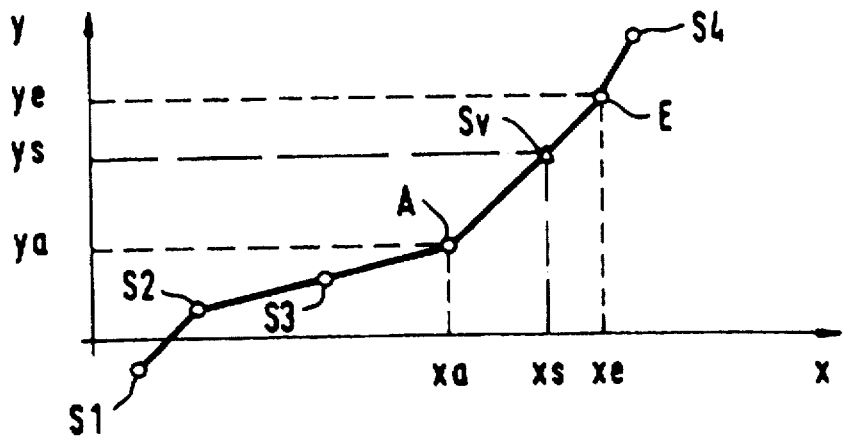
FIG. 4 shows a function approximated with known values.

FIG. 4 shows, in a two-dimensional coordinate system x, y, a curve defined by the known values S1, S2, S3, A, E, and S4. The required intermediate values are to be determined by linear interpolation between the respective adjacent known values. As an example, the intermediate value Sv has been drawn in. The y-coordinate value ys belonging to the given x-coordinate value xs is to be determined. First, the adjacent known values, namely the first known value A and the second known value E, must be determined from the multitude of known values. Their coordinate values are used to carry out the interpolation according to the invention.

Figure 5:
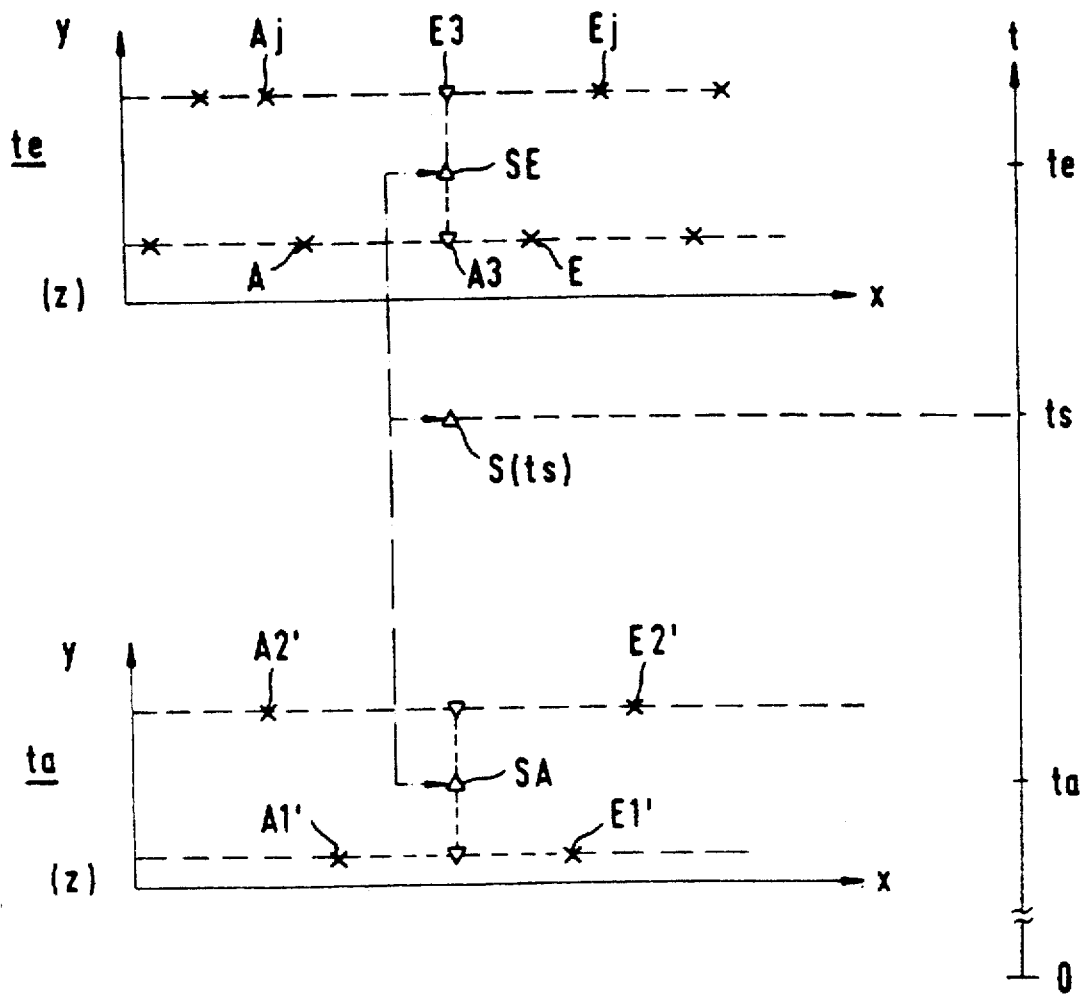
FIG. 5 shows schematically an interpolation in a four-dimensional coordinate system, with the fourth dimension corresponding to a time axis.

FIG. 5 shows schematically a four-dimensional coordinate system with the coordinate directions x, y, z, t. The time axis t forms the fourth coordinate direction. The upper and lower parts of FIG. 5 are top views of three-dimensional coordinate systems x, y, z, with the projections of the known values in the x/y-plane. The known values, represented as crosses, are arranged in rows in the x-direction. An arrangement in columns would also be permissible—but no disordered distribution.

In the upper part of FIG. 5, the intermediate value SE to be interpolated is given in the x- and y-directions—in the z-direction, the associated interpolation value is to be found. First, the adjacent known values A, E, Aj, Ej and their coordinate values in the x- and y-directions are determined. Thereafter, a first auxiliary known value A3 and a second auxiliary known value E3 must be interpolated. A first interpolation in the x-direction between the first and second known values A, E provides the first auxiliary known value A3. The known values are arranged in rows in the x-direction, the initial interpolations for the auxiliary known values A3 and E3 must also be performed in the x-direction. If the known values were arranged in columns, the auxiliary known values would have to be interpolated in the y-direction. A second interpolation in the x-direction between the second known-value pair Aj, Ej provides the second auxiliary known value E3. The two auxiliary known values A3, E3 now serve as first and second known values for a further interpolation which is performed in the y-direction. By linear interpolation between the first and second auxiliary known values A3, E3, the intermediate value SE is found. In accordance with the time axis t, this intermediate value SE is defined at the instant te.

In general it can be assumed that the known values in the n-dimensional coordinate system are not independent of one another. Thus, in the example of FIG. 5, also, the locations of the known values are dependent on the instant t.

At the instant ta, the lower part of the chart of FIG. 5 shows the projection of a few known values in the x/y plane, namely those known values which are adjacent to the intermediate value SA to be interpolated. When this intermediate value SA has been found, an intermediate value S(ts) can be interpolated at the instant ts. This is illustrated in FIG. 5 by a dash-and-dot line which connects the two auxiliary known values SE and SA as a straight interpolation line (the straight line is shown laterally displaced) and contains the required intermediate value S(ts).

To find the intermediate value S(ts) in the four-dimensional coordinate system, a total of seven interpolations are necessary. An interpolation can be performed in the n-dimensional coordinate system by means of $2^{(n-1)}-1$ interpolations in respective two-dimensional coordinate systems. However, the computation effort can be greatly reduced if the interpolation in high-dimensional spaces can be replaced with a number of parallel and/or serial interpolations in low-dimensional spaces. The output values of these low-dimensional interpolations form intermediate values Hi or auxiliary known values for the subsequent interpolations until the required output value S is finally obtained. The computation effort is minimized if the n-dimensional interpolation can be decomposed into three-dimensional interpolations. A decomposition into low-dimensional spaces is not possible in all cases, of course; a prerequisite is that the input variables Vi of different interpolation spaces are not dependent on each other or on third variables. In that case, the decomposition would suppress this dependence, and the result would be erroneous.

Figure 10:
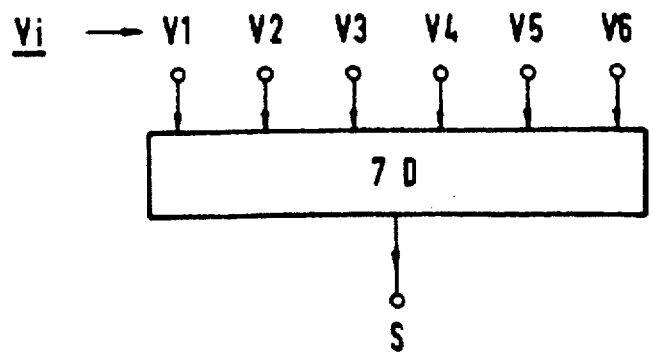
FIGS. 10, 11, and 12 show schematically iterations in the 7-dimensional space.
Figure 11:
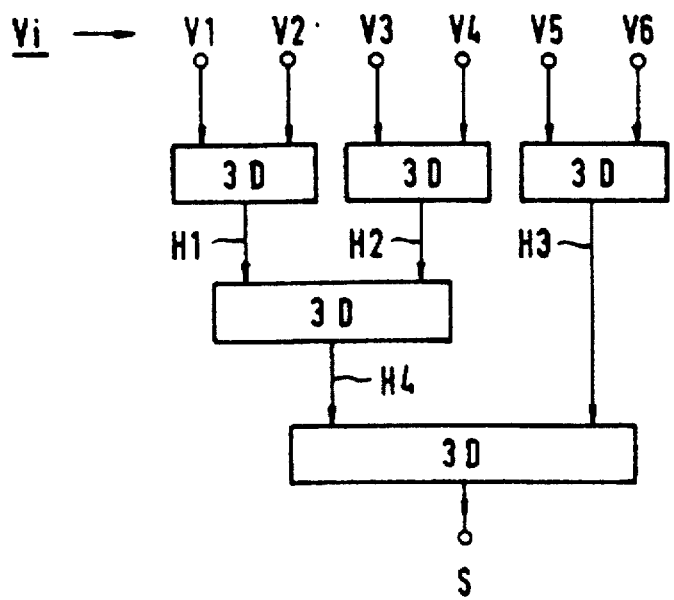
Figure 12:
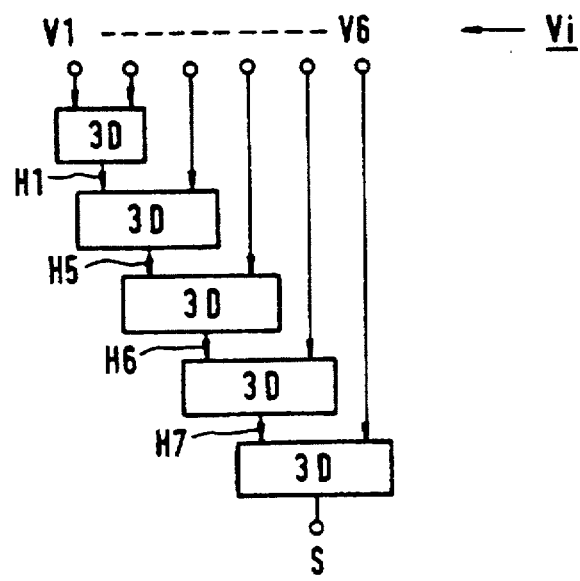

An interpolation in the 7-dimensional space is illustrated schematically in FIG. 10. It requires 63 two-dimensional interpolations. FIGS. 11 and 12 show how this interpolation problem can be decomposed into five interpolations in three-dimensional spaces, with FIG. 11 illustrating a mixed parallel/serial decomposition and FIG. 12 a purely serial decomposition. Each interpolation in the three-dimensional space require three two-dimensional interpolations. Thus, with the separation illustrated in FIG. 11 or FIG. 12, only 15 two-dimensional interpolations are necessary. With an n-dimensional space decomposed into three-dimensional spaces, the number Ad of two-dimensional interpolations is $$Ad=(m-2)*3$$

The more dimensions the iteration includes, the more effective the decomposition into low-dimensional spaces will be. For example, an 11-dimensional space already requires 1023 two-dimensional iterations. If this space is decomposed into three-dimensional spaces, the number of two-dimensional iterations reduces to Ad=27.

Figure 6:
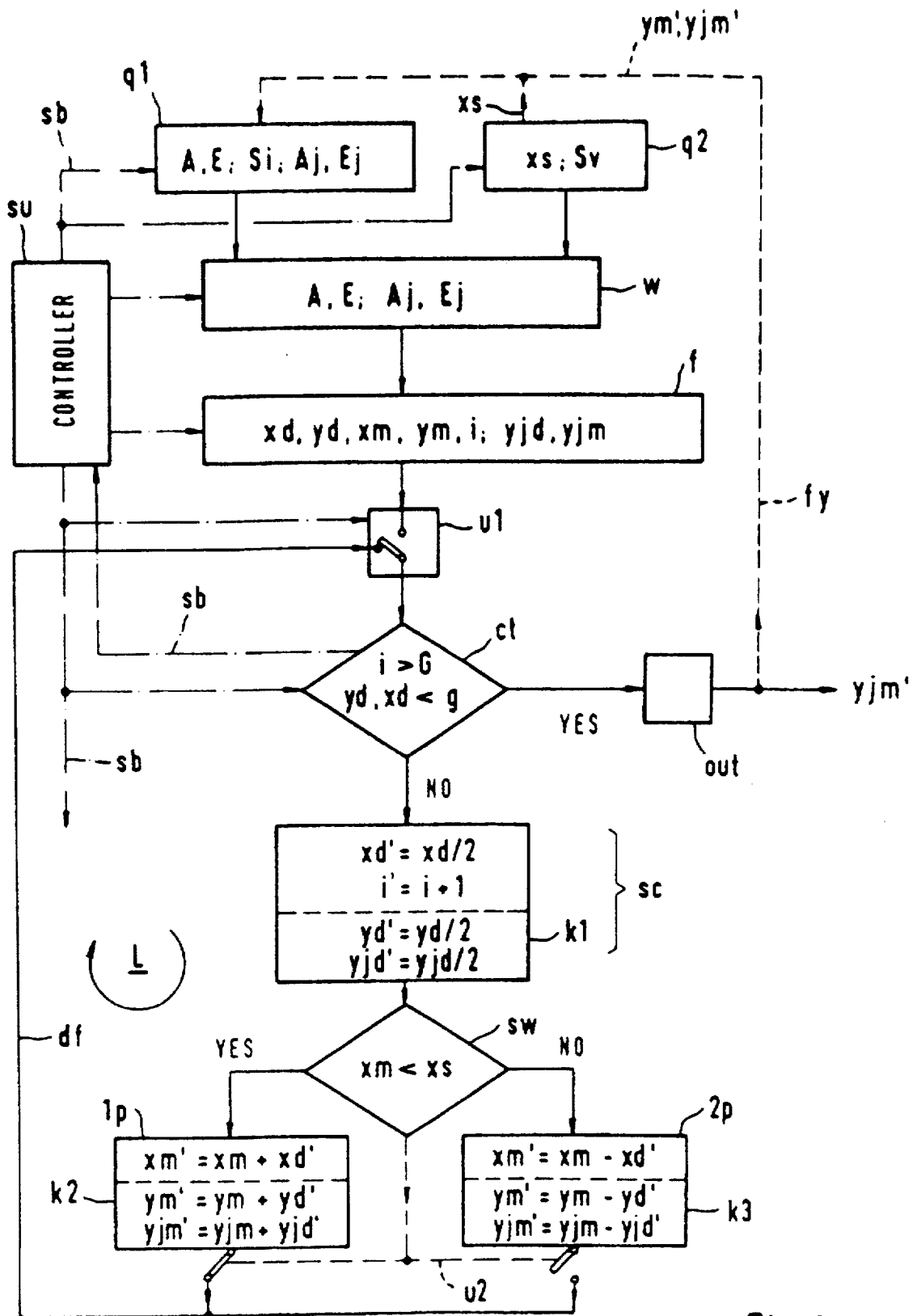
FIG. 6 is a block diagram of one embodiment of the interpolator according to the invention.

FIG. 6 is a block diagram of a novel interpolator which performs interpolations in the two-dimensional coordinate system. This interpolator, which represents a basic unit, is also suitable for interpolations in an n-dimensional space, because these can always be decomposed into two-dimensional interpolations, as stated above.

In the embodiment of FIG. 6, a first source q1 provides a number of known values A, E; Si; Aj, Ej, with which coordinate values are associated in the individual coordinate directions. A second source q2 provides the known coordinate values of the intermediate value or values Sv to be interpolated, e.g., the first intermediate value xs. The coordinate values stored in the first and second sources are fed to a selection circuit w which determines the known values adjacent to the intermediate value Sv to be interpolated, see FIG. 1. The selection is made, for example, by taking the difference of the equal-direction coordinate values of the first and second sources and evaluating it. The result provided by the selection circuit is at least one first known value A and one second known value E which are adjacent to the first intermediate value xs. If necessary, known values Aj, Ej located parallel to those known values A, B may be additionally determined to perform the iteration in one or more ranges, see FIG. 5. This reduces the number of independent iterations.

Coupled to the selection circuit w is an initialization stage f in which the following values are formed: a first difference value xd and a second difference value yd, a first approximate value xm and a second approximate value ym, and, if necessary, a loop count value i and the additional values yjm and yjd. The first difference value xd is one-half the distance between the first coordinate values xa, xe; the second difference value yd is one-half the distance between the second coordinate values ya, ye. The first approximate value xm is located precisely between the first coordinate values xa, xe, and the second approximate value ym between the second coordinate values ya and ye. The values yjm and yjd of the parallel range j are formed analogously if necessary. The loop count value i is set to 1.

The values formed in the initialization stage f are fed via an electronic switch u1 to a breakoff detection stage ct which compares either the loop count value i or one of the difference values xd, yd with a limit value G or g, respectively, and breaks off the iteration if the loop count value i passes above the limit value G or if one of the difference values xd, yd passes below the limit value g. If the iteration is not broken off, the outputs of the switch u1 will be connected to a step-size changing device sc. There, by a shift operation, the first difference value xd is halved and, if necessary, the loop count value i is incremented by one unit. By means of a first copying device k1, the second difference value yd and, if necessary, the value yjd are also halved by a shift operation.

A decision stage sw now checks whether the first approximate value xm is less than, greater than, or equal to the first intermediate value xs. As in most cases of signal processing, it makes no difference which side the equal value is assigned to. If xm is less than xs, a first modified value xm' will be formed in a first approximation stage 1p by adding the current first difference value xd' to the first approximate value xm. As will be remembered, this value xd' was obtained in the step-size-changing device sc by halving the original first difference value xd.

In a second, parallel copying device k2, modified second approximate value ym' and, if necessary, a modified additional value yjm' are formed by adding the current second difference value yd', yjd' to the current second average value ym, yjm. If the comparison in the decision stage sw indicates that xm is greater than xs, a second approximate stage 2p will form another first modified approximate value xm' by subtracting the current first difference value xd' from the current first approximate value xm. In a similar manner, a third copying device k3 forms modified second approximate value ym', then represents the desired controlled variable, i.e., the actuating signal.

A particularly advantageous application of the novel interpolator is the interpolation of characteristics or families of characteristics for control functions, particularly in the automotive field. There, characteristics, families of characteristics, or three-dimensional characteristics maps are used, for example, to determine gear-changing times in transmission control systems or injection times and quantities in motor electronics.

Interpolation in a multidimensional space is also of special interest in connection with fuzzy logic systems. Conventional systems use the scheme of FIG. 7. For example, a number of input variables V1 to V5 are fed to a "fuzzifier" fu, which "fuzifies" the input variable with the aid of linguistic operators. These "fuzzified" processed with the aid of an arithmetical circuit, i.e., the inferences between these values are formed in an inference device. Finally, a fixed output value must be calculated from the values provided by the inference device. This step is performed in a "defuzzifier" stage fz. Such fuzzy systems are described, for example, in "Computertechnik" (abbreviated" "c't"), 1991, No. 3, pages 188 to 206, with page 199 giving a condensed introduction.

For an existing system, the input variables are always combined in the same way with the aid of constant "fuzzy operators". For a system with two input variables xs, ys and an output value zs, a three-dimensional map as shown approximatively in FIG. 8 is thus obtained. There, for each point in the x/y plane, which is defined by the associated x- and y-coordinate values, an associated output variable is plotted in the z-coordinate direction. The entire fuzzy logic system thus represents an implementation of a three-dimensional map over the input variables xs and ys.

This three-dimensional map is illustrated in FIG. 8 approximatively by a network of known values, with intermediate values being obtainable in a simple manner by means of an interpolator according to the invention. Instead of the relatively complicated fuzzy operation, an interpolation according to the invention leads to the same result in a much simpler manner. With the interpolation solution according to the invention, the implementation of the relatively complicated control action, particularly in the case of fuzzy logic systems, only necessitates storing relatively few known values in conjunction with an iterative interpolator.

The halving of the step size in each iteration step has the advantage that the approximate values can never leave the range of values formed by the first and second known values A, V—this follows mathematically from the finite series sum—whereby the family of characteristics can be further simplified. If the family of characteristics remains constant for greater or smaller values in the respective coordinate direction, no further known values are necessary in this direction. The first and second adjacent known values a, b may then be identical, whereby the iteration is immediately broken off. It is also possible, however, that the last and the next to the last known values with respect to the input variable xs are selected as adjacent known values A, B, since then, because of the infinite series sum of the interval nesting starting from the first approximate value xm, the last known value cannot be exceeded. The breakoff criterion must then be a loop count value G, because in this case, xa<xm'<xe.

FIG. 9 is a simplified representation of a control or fuzzy system with two input variables xs and ys. The associated output quantity zs is replaced with the approximate value zm' formed by the interpolator ip. This results in a three-dimensional map x, y, z which could look similar to that of FIG. 8. The associated known values Si, which are arranged in a network configuration, are taken from a known-value memory rs, where the coordinate values associated with each known value Si in the three coordinate directions x, y, z are stored.

From the above, it should be understood that the embodiment described, in regard to the drawings, is merely exemplary and that a person skilled in the art may make variations and modifications to the shown embodiment without departing from the spirit and scope of the invention. All such variations and modifications are intended to be included within the scope of the invention as defined in the appended claims.

We claim:

1. An apparatus for linear interpolation between known values defined by a n-dimensional coordinate system, comprising:

a controller for providing a plurality of control signals;

a first register coupled to said controller and responsive to one of said control signals for storing data corresponding to coordinate values of said known values;

a second register coupled to said controller and responsive to another one of said control signals for storing coordinate values of an intermediate value to be interpolated;

a selection circuit coupled to said controller and responsive to another one of said control signals for selecting known coordinate values from said first register which are adjacent to one of said intermediate values of said second register, said known coordinate values including at least a first known value and a second known value;

an initialization stage coupled to said controller and said selection circuit, said initialization stage responsive to another one of said control signals for forming a first approximate value (xm) and a first difference value (xd) from said first and second coordinate values (xa,xe;ya, ye) of said first and second known values, with said first difference value xd being equal to (xe−xa)/2, with xa being preferably less than xe, wherein said first approximate value (xm) is calculated by means of the following relationship: xm=xa+xd;

iteration loop means coupled to said controller and said initialization stage, said iteration loop means responsive to another one of said control signals for performing an interval nesting process in a first coordinate direction with respect to said intermediate value by means of said first approximate value and said first difference value, the iteration being performed between first coordinate values of said first and second known values to thereby provide a modified first approximate value; and copying means coupled to said controller and responsive to another one of said control signals for linearly transferring said interval nesting process carried out in said first coordinate direction to a coordinate section in a second coordinate direction, said coordinate section defined by second coordinate values of said first and second known values, whereby a modified second approximate value is output as the required interpolation value via an output stage when a breakoff criterion is reached.

2. The apparatus of claim 1, wherein said initialization stage is operative to form a second difference value (yd) from said first and second coordinate values (xa, xe; ya, ye) of said first and second known values, with said second difference value yd being equal to (ye−ya)/2, wherein a second approximate value (ym) from the second coordinate values (ya, ye) of the first and second known values is calculated by means of the following relationship: ym=ya−yd.

3. The apparatus of claim 1, wherein said coordinate system is defined in two dimensions and said required interpolation is calculated according to a ratio R, wherein R=Z1*Z2/N and in said first coordinate direction, said first known valie is defined by first and second coordinate values (xa=0, ya=0), said second known value by first and second coordinate values (xe=N, ye=Z1), and said intermediate value to be interpolated by a first intermediate value xs=Z2, wherein said first and second coordinate values are greater than or equal to 0.

4. The apparatus of claim 1, wherein said coordinate system is defined in two dimensions and said required interpolation is calculated according to a ratio R, wherein R=Z1/N and in said first coordinate direction, said first known value is defined by first and second coordinate values (xa=−N, ya=−Z1), said second known value by first and second coordinate values (xe=+N, ye=+Z1), and said intermediate value to be interpolated by a first intermediate value xs=+Z2, wherein said first and second coordinate values are at least partly negative.

5. The apparatus of claim 1, wherein said apparatus is adapted for use in a control circuit of a fuzzy logic system, wherein said apparatus is operative to assign n=1 input variables to an output variable, and wherein a control characteristic in said fuzzy logic system is defined by a multitude of known values in an n-dimensional coordinate system, with each of said n−1 input variables and said output variable assigned one coordinate direction, with necessary intermediate values between said known value coordinate values being interpolated linearly.

6. The apparatus of claim 5, wherein said n−1 input variables and the coordinate values of said intermediate value to be interpolated, are divided into groups to carry out a low-dimensional interpolation, with the necessary interpolations in each low-dimensional interpolation being performed two-dimensionally, wherein output values of said low-dimensional interpolation form intermediate values for subsequent low-dimensional interpolations, and an output of the last interpolation in a direction of signal flow provides a required output value in a coordinate direction n.

7. The apparatus of claim 6, wherein said low dimensional interpolation is three-dimensional.

8. The apparatus of claim 1, wherein said iteration loop means includes a breakoff detection stage, said breakoff detection stage being operative to detect a limit value and breakoff subsequent iterations once said limit value is reached.

9. The apparatus of claim 8 further including switching means coupled to said breakoff detection stage operative to switch between an iteration loop an said initialization stage.

10. The apparatus of claim 8, further including a step-size-changing device coupled to said breakoff detection stage, wherein said difference values are modified by means of shift operation.

11. The apparatus of claim 10, further including a decision stage coupled to said step-size-changing device for determining whether said approximate value is less than said intermediate value.

12. The apparatus of claim 1, wherein said copying means is operative to form a first modified approximate value in a first approximation stage by adding a current first difference value to a current first approximate value, said copying means including a second parallel copying device for forming a modified second approximate value by adding a current second difference value to a current second average value.

13. The apparatus of claim 12, further including a second approximation stage operative to form another first modified approximate value by subtracting a current first difference value from a current first approximate value, and including a third copying device operative to form a modified second approximate value.

14. A method for performing linear interpolation between known values defined by a n-dimensional coordinate system, said method for use in a control circuit of a fuzzy logic system, wherein said control circuit is operative to assign n−1 input variables to an output variable, and wherein a control characteristic in said fuzzy logic system is defined by a multitude of known values in an n-dimensional coordinate system with each of said n−1 input variables and said output variable assigned one coordinate direction, with necessary intermediate values between said known value coordinate values being interpolated linearly comprising the steps of:

storing data corresponding to coordinate values of said known values in a first register;

storing coordinate values of an intermediate value to be interpolated in a second register;

selecting known coordinate values from said first register which are adjacent to one of said intermediate values of said second register, said known coordinate values including at least a first known value and a second known value;

forming a first approximate value (xm) and a first difference value (xd) from said first and second coordinate values (xa,xe;ya,ye) of said first and second known values, with said first difference value xd being equal to (xe−xa)/2, with xa being preferably less than xe, wherein said first approximate value (xm) is calculated by means of the following relationship: xm=xa+xd performing an interval nesting process in a first coordinate direction with respect to said intermediate value by means of said first approximate value and said first difference value, the iteration being performed between first coordinate values of said first and second known values to thereby provide a modified first appoximate value; and linearly transferring said interval nesting process carried out in said first coordinate direction to a coordinate section in a second coordinate direction, said coordinate section known values, whereby a modified second approximate value is output as the required interpolation value via an output stage when a breakoff criterion is reached.

15. The method of claim 14, forming a second difference value (yd) from said first and second coordinate values (xa,xe;ya,ye) of said first and second known values, with said second difference value yd being equal to (ye−ya)/2, wherein a second approximate value (ym) from the second coordinate values (ya,ye) of the first and second known values is calculated by means of the following relationship: ym=ya+yd.

16. The method of claim 14, wherein said coordinate system is defined in two dimensions and said required interpolation is calculated according to a ratio R, wherein R =Z1*Z2/N and in said first coordinate direction, said first known value is defined by first and second coordinate values (xa=0, ya=0), said second known value by first and second coordinate values (xe=N, ye=Z1), and said intermediate value to be interpolated by a first intermediate value xs=Z2, wherein said first and second coordinate values are greater than or equal to 0.

17. The method of claim 14, wherein said coordinate system is defined in two dimensions and said required interpolation is calculated according to a ratio R, wherein R =Z1/N and in said first coordinate direction, said first known value is defined by first and second coordinate values (xa=−N, ya=−Z1), said second known value by first and second coordinate values (xe=+N, ye=+Z1), and said intermediate value to be interpolated by a first intermediate value xs=+Z2, wherein said first and second coordinate values are at least partly negative.

18. The method of claim 14, wherein said n−1 input variables and the coordinate values of said intermediate value to be interpolated, are divided into groups to carry out a low-dimensional interpolation, with the necessary interpolations in each low-dimensional interpolation being performed two-dimensionally, wherein output values of said low-dimensional interpolation form intermediate values for subsequent low-dimensional interpolations, and an output of the last interpolation in a direction of signal flow provides a required output value in a coordinate direction n.

19. The method of claim 14, including the step of detecting a limit value in said interval nesting process and breaking off subsequent iterations once said limit value is reached.

20. The method of claim 19 including the step of switching between an iteration loop an said initialization stage.

21. The method of claim 19, including the step of modifying said difference values by means of shift operation in a step-size-changing device.

22. The method of claim 21, further including the step of determining whether said approximate value is less than said intermediate value.

23. The method of claim 14, including the step of forming a first modified approximate value in a first approximation stage by adding a current first difference value to a current first approximate value, and forming a modified second approximate value by adding a current second difference value to a current second average value.

24. The method of claim 23, including the step of forming another first modified approximate value by subtracting a current first difference value from a current first approximate value, and also forming a modified second approximate value.

25. An apparatus for linear interpolation between known values defined by a n-dimensional coordinate system, comprising:

a controller for providing a plurality of control signals;

an initialization stage coupled to said controller and responsive to one of said control signals for forming a first approximate value (xm) and a first difference value (xd) from first and second coordinate values (xa,xe;ya,ye) of said known values, with said first difference value xd being equal to (xe,xa)/2, with xa being preferably less than xe, wherein said first approximate value (xm) is calculated by means of the following relationship: xm=xa+xd;

iteration loop means coupled to said controller and said initialization stage, said iteration loop means responsive to another one of said control signals for performing an interval nesting process in a first coordinate direction with respect to said intermediate value by means of said first approximate value and said first difference value, the iteration being performed between first coordinate values of said first and second known values to thereby provide a modified first approximate value; and copying means coupled to said controller and responsive to another one of said control signals for linearly transferring said interval nesting process carried out in said first coordinate direction to a coordinate section in a second coordinate direction, said coordinate section defined by second coordinate values of said first and second known values, whereby a modified second approximate value is output as the required interpolation value via an output stage when a breakoff criterion is reached.

* * * * *